United States Patent [19]

Vincent-Genod

[11] Patent Number: 5,575,217
[45] Date of Patent: Nov. 19, 1996

[54] WHEEL SET FOR A VEHICLE TRAVELLING ON A GUIDE PATH

[75] Inventor: Bruno Vincent-Genod, Neuilly sur Seine, France

[73] Assignees: Matra Transport, Montrouge Cedex, France; Vevey Technologies, Villeneuve, Switzerland

[21] Appl. No.: 601,535

[22] Filed: Feb. 14, 1996

Related U.S. Application Data

[63] Continuation of Ser. No. 262,529, Jun. 20, 1994, abandoned.

[30] Foreign Application Priority Data

Jun. 21, 1993 [FR] France .................................. 93 07474

[51] Int. Cl.⁶ ............................ B61F 13/00; B61D 15/00
[52] U.S. Cl. ...................................... 104/247; 105/215.1
[58] Field of Search .................................. 104/119, 139, 104/242, 247; 105/72.2, 157.1, 182.1, 215.1, 136; 180/131

[56] References Cited

U.S. PATENT DOCUMENTS 3,434,432  3/1969  Seifert ..................................... 105/72.2
4,275,660  6/1981  Forster .................................... 104/247

FOREIGN PATENT DOCUMENTS 0465411   1/1992   European Pat. Off. .
0464929   1/1992   European Pat. Off. .
2639596   1/1990   France .
2675105  10/1992   France .
2354301   5/1975   Germany .

Primary Examiner—Robert J. Oberleitner
Assistant Examiner—Kevin D. Rutherford
Attorney, Agent, or Firm—Larson and Taylor

[57] ABSTRACT

The wheel set comprises a pair of load-carrying wheels that run on a track, and that are steerable about parallel axes on a fixed portion, together with two pairs of guide wheels for bearing laterally against the track. The pairs of guide wheels are situated on either side of the load-carrying wheels, and they are carried by the same guide frame which is displaceable relative to the fixed portion only in rotation about a vertical axis. The guide frame is connected to the load-carrying wheels by a forced steering linkage for the load-carrying wheels. The fixed portion is constituted by a transverse box girder placed above the guide frame and provided with steering pivots for the load-carrying wheels, which pivots are placed beneath suspension cushions for the vehicle.

9 Claims, 6 Drawing Sheets

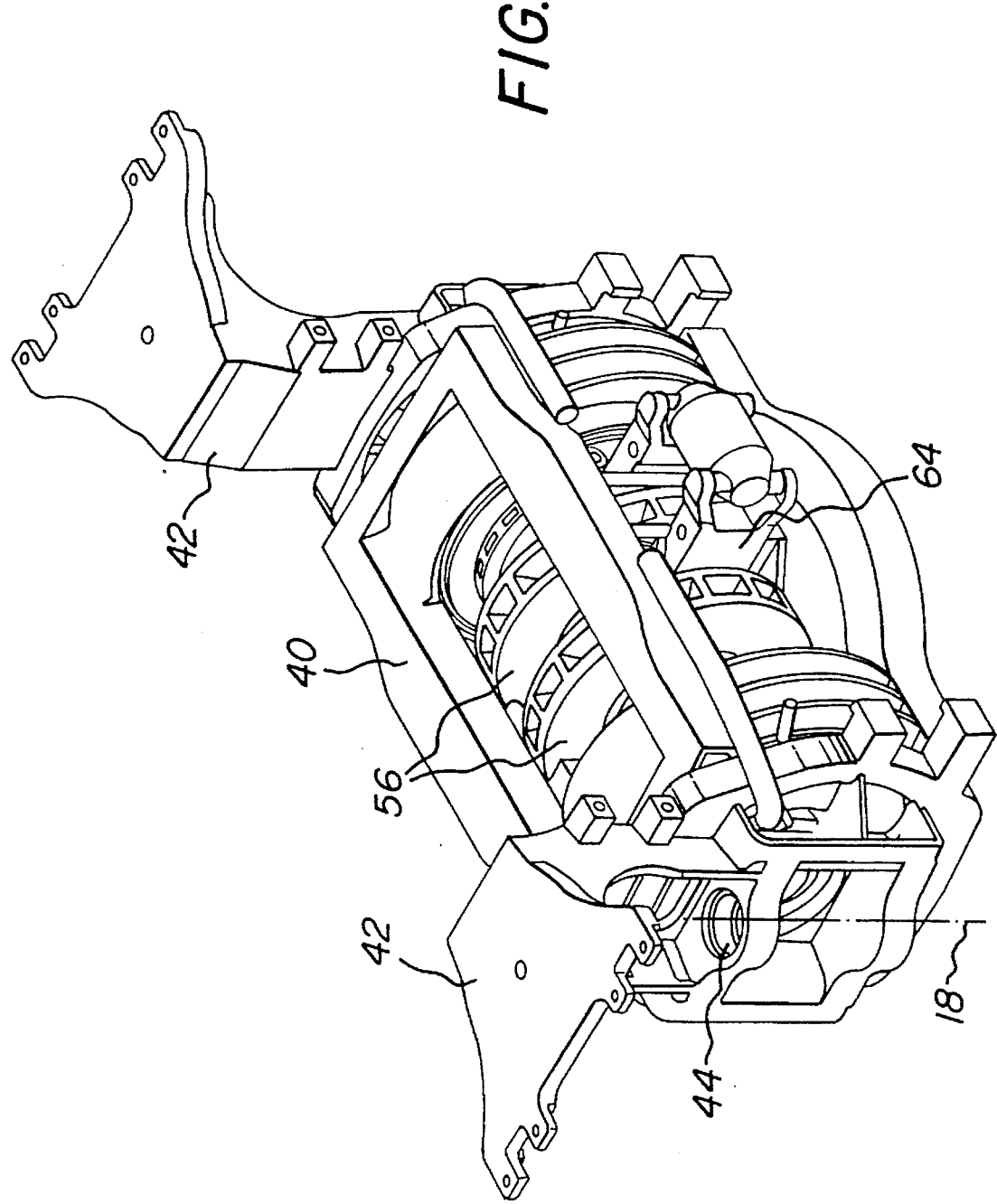

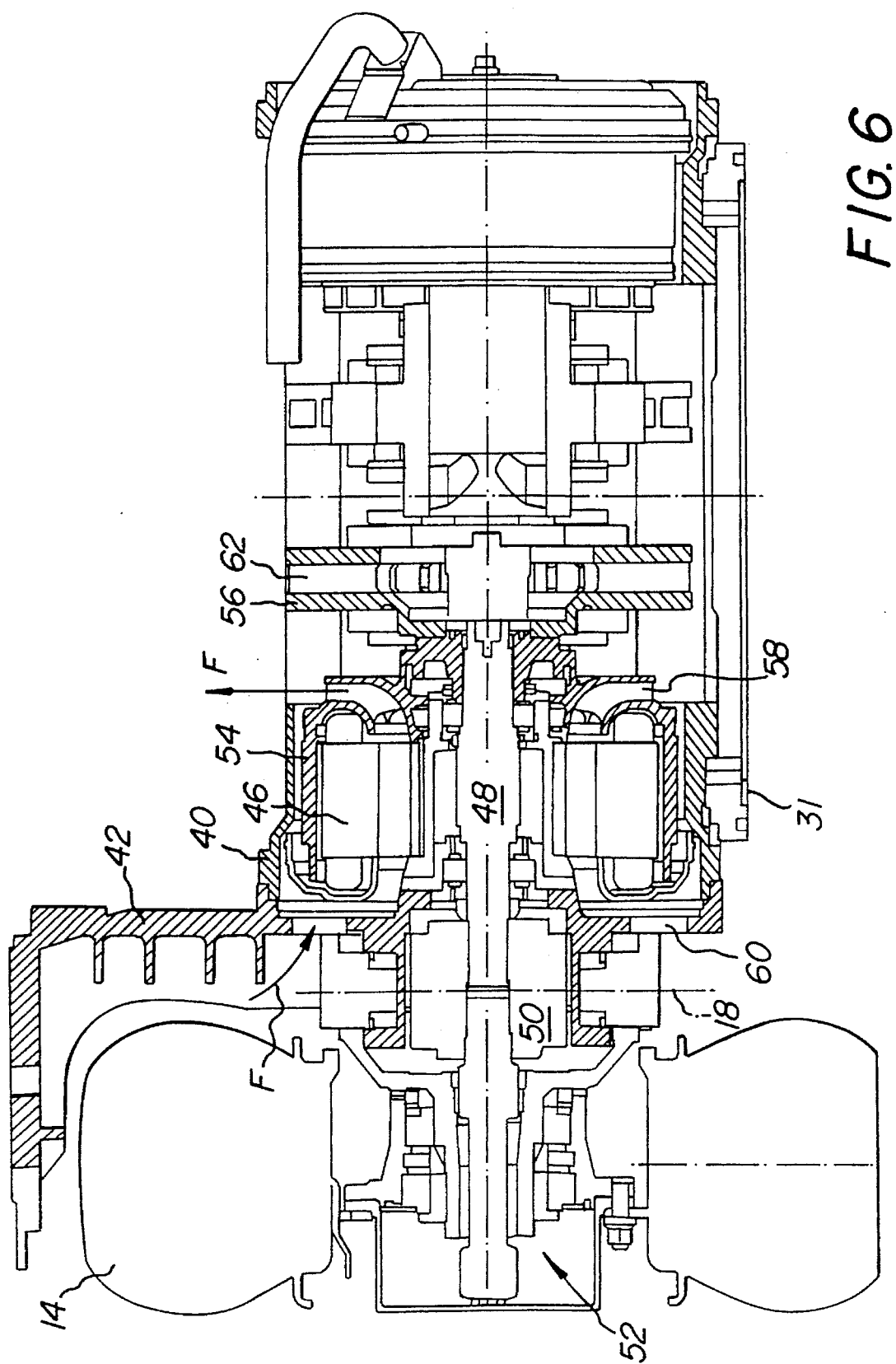

WHEEL SET FOR A VEHICLE TRAVELLING ON A GUIDE PATH

This application is a continuation of application Ser. No. 08/262,529 filed Jun. 20, 1994 now abandoned.

BACKGROUND OF THE INVENTION

The present invention relates to wheel sets for vehicles capable of travelling in either direction along a guide path, and including at least a front set and a rear set, each set having steerable load-carrying wheels.

More particularly, the invention relates to a wheel set of the type having a pair of load-carrying wheels that are steerable about parallel axes relative to a fixed portion, and two pairs of guide wheels for bearing laterally against the track, the pairs of guide wheels being situated on either side of the load-carrying wheels in the direction of travel along the track, and being carried by a common guide frame that is displaceable relative to the fixed portion, the fixed portion being constituted by a transverse box girder placed above the guide frame and provided with steering pivots for the load-carrying wheels, which pivots are placed beneath cushions providing suspension for the vehicle on the wheel set.

A wheel set of the above-defined type is already known from FR-A-2,675,105, in which the fixed portion is constituted by a central driving axle supporting the body of the vehicle via lateral arms and lateral pneumatic cushions. The driving axle receives motive power from a motor carried by the body of the vehicle. The guide frame is displaceable both in rotation and in translation relative to the fixed portion. The guide wheels serve as feelers for controlling the steering of the load-carrying wheels: rotation of the guide frame causes the load-carrying wheels to steer so as to follow the direction of the path, and translation thereof acts via hydraulic cylinders to cause the load-carrying wheels to steer excessively for the purpose of compensating for the lateral forces to which the vehicle is subjected. The lateral forces are therefore taken up by the load-carrying wheels and not by the guide wheels. The ability of the guide frame to move in translation requires the use of hydraulic cylinders and of the associated controls. It therefore tends to complicate the structure of the wheel set, and that would appear to be undesirable in the context of rail transport where safety requirements are particularly severe.

SUMMARY OF THE INVENTION

A result looked for by the invention is the implementation of a wheel set that is simplified and lightened by a better distribution of forces. To achieve this, a wheel set of the type defined above is proposed in which the guide frame is displaceable relative to the fixed portion only in rotation about a vertical axis, and is connected to the load-carrying wheels by a linkage for forced steering of the load-carrying wheels.

By virtue of the above disposition, the fixed portion can be considerably lighter in weight. It may be made of a lightweight material such as aluminum. The rotary connection between the guide frame and the box girder may be constituted by a ball-bearing ring. This achieves decoupling between the vertical forces taken up by the load-carrying wheels and the lateral forces taken up by the wheels and by the guide frame. The load-carrying wheels can but follow the direction of the track given by the guide frame and they have no steering ability for compensating the lateral forces. This results in a simplified structure for the wheel set.

The invention also provides other dispositions enabling the wheel set to be lightened further, and advantageously used in combination with the preceding characteristic, but also capable of being used independently.

In particular, each of the load-carrying wheels may be connected via a stepdown gear box and a constant velocity joint to the annular rotor of an electric traction motor whose stator is fixed to a lateral flange supporting one of the lateral pneumatic cushions and receiving the steering pivot of said load-carrying wheel. Said annular rotor may be connected to the constant velocity joint via a central shaft passing through the stator and carrying a disk brake on its end opposite to the load-carrying wheel. In particular, the electric motors may be polyphase motors having permanent-magnet rotors, thereby avoiding the need for electrical connections via rotary commutators or slip-rings.

When the fixed portion is constituted by a box girder, the flanges belong to the girder and the motors are advantageously placed inside the girder, which has openings formed therethroough to allow air to pass for the purpose of ventilating disk brakes and for the purpose of ventilating the motor.

An additional advantage of a wheel set including a motor for each load-carrying wheel that is also a driving wheel lies in reducing the moment that must be transmitted by the guide wheels and the frame in the event of one of the load-carrying wheels jamming. When both wheels are drivenby the same electric motor via a driving axle, then, in the event of one of the wheels jamming, the remaining wheel has all of the driving torque applied thereto.

BRIEF DESCRIPTION OF THE DRAWINGS

FIG. 5 is a perspective view of the box girder when assembled; and

FIG. 6 is a fragmentary view in axial section through the box girder.

DESCRIPTION OF A PREFERRED EMBODIMENT

Figure 1:
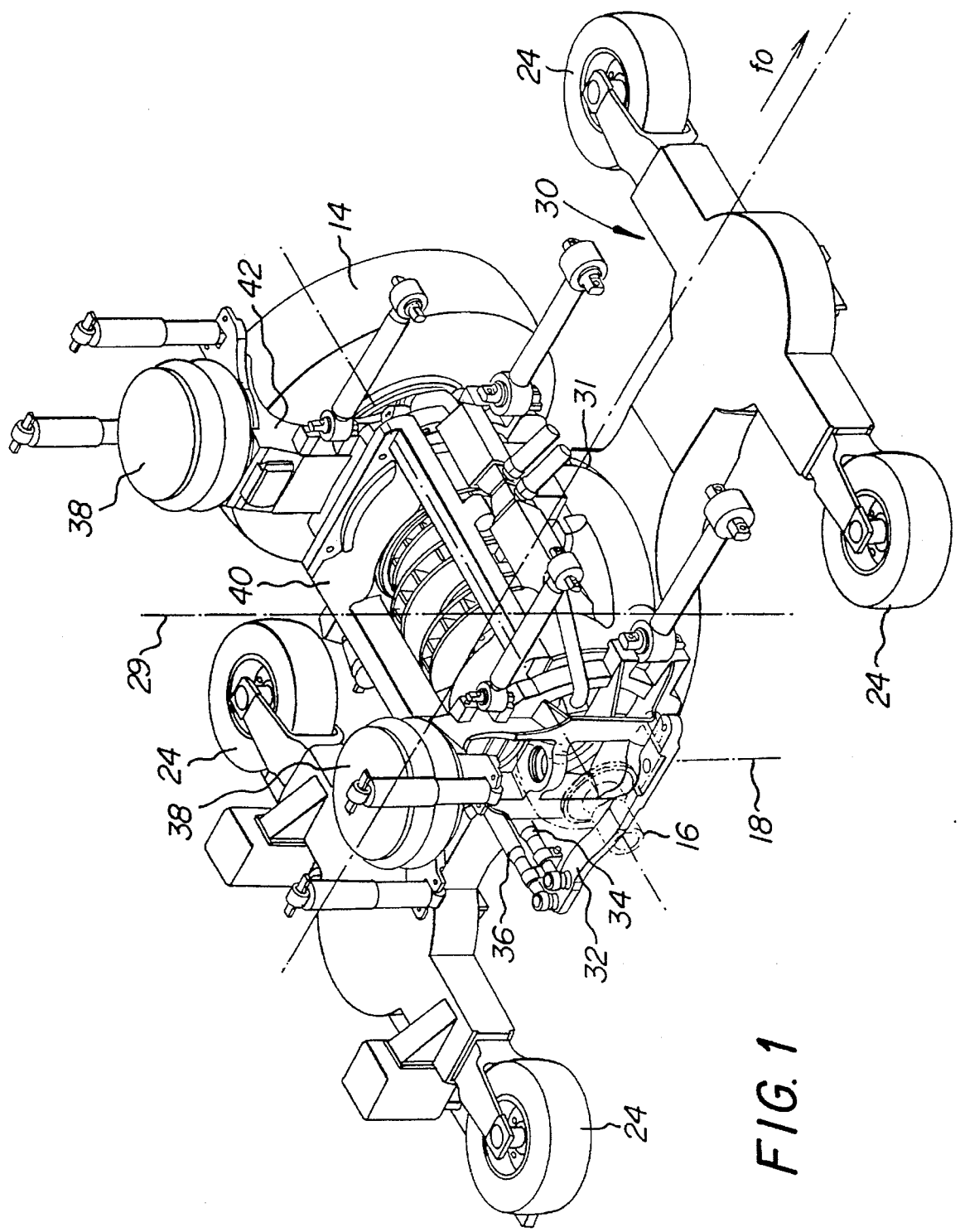
FIG. 1 is a perspective view of a driving wheel set of the invention that is particularly suitable for use in an automatically driven transport vehicle, with some of the elements that are not directly concerned by the invention and one of the load-carrying wheels being omitted to improve clarity.
Figure 2:
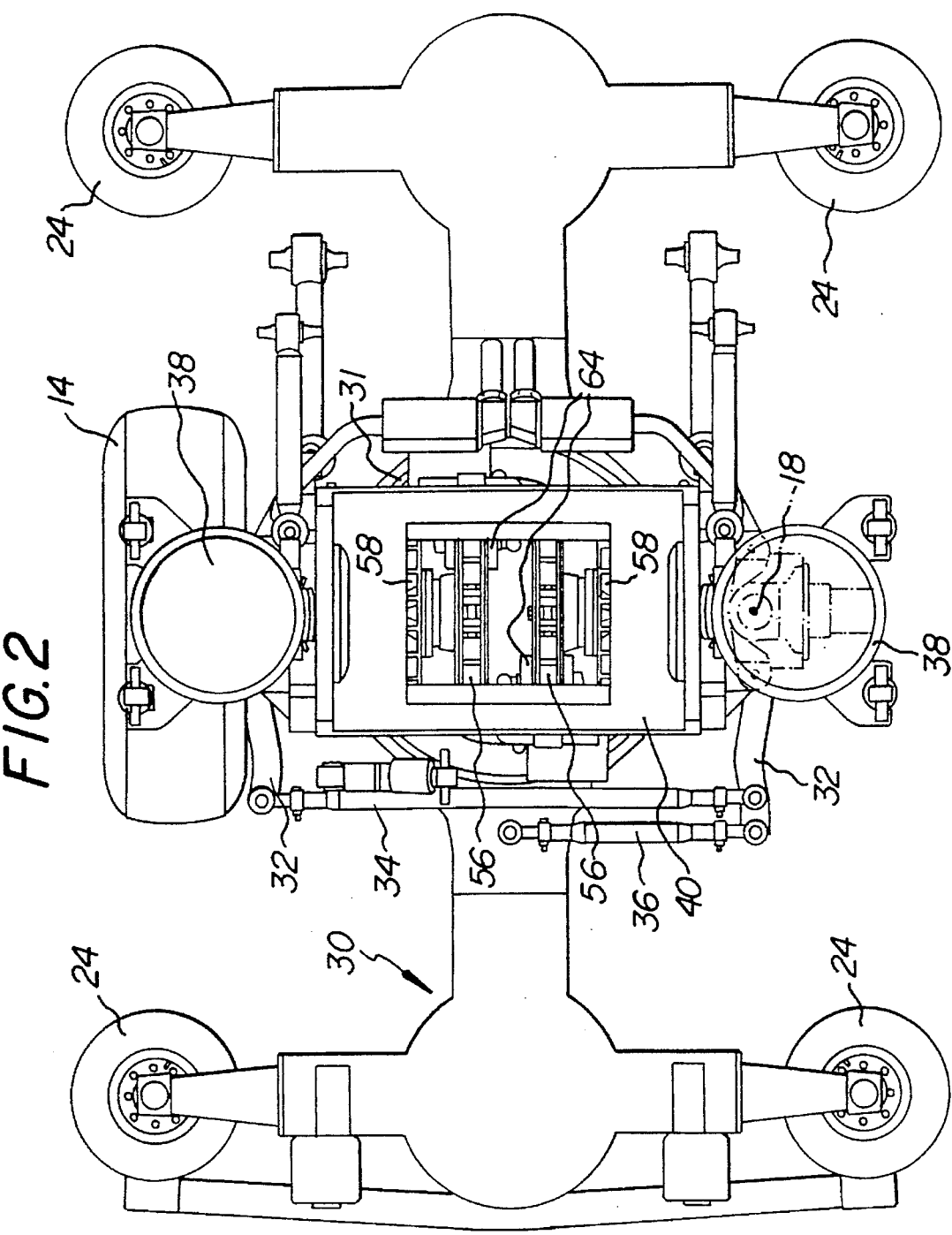
FIG. 2 is a plan view of the FIG. 1 wheel set.
Figure 3:
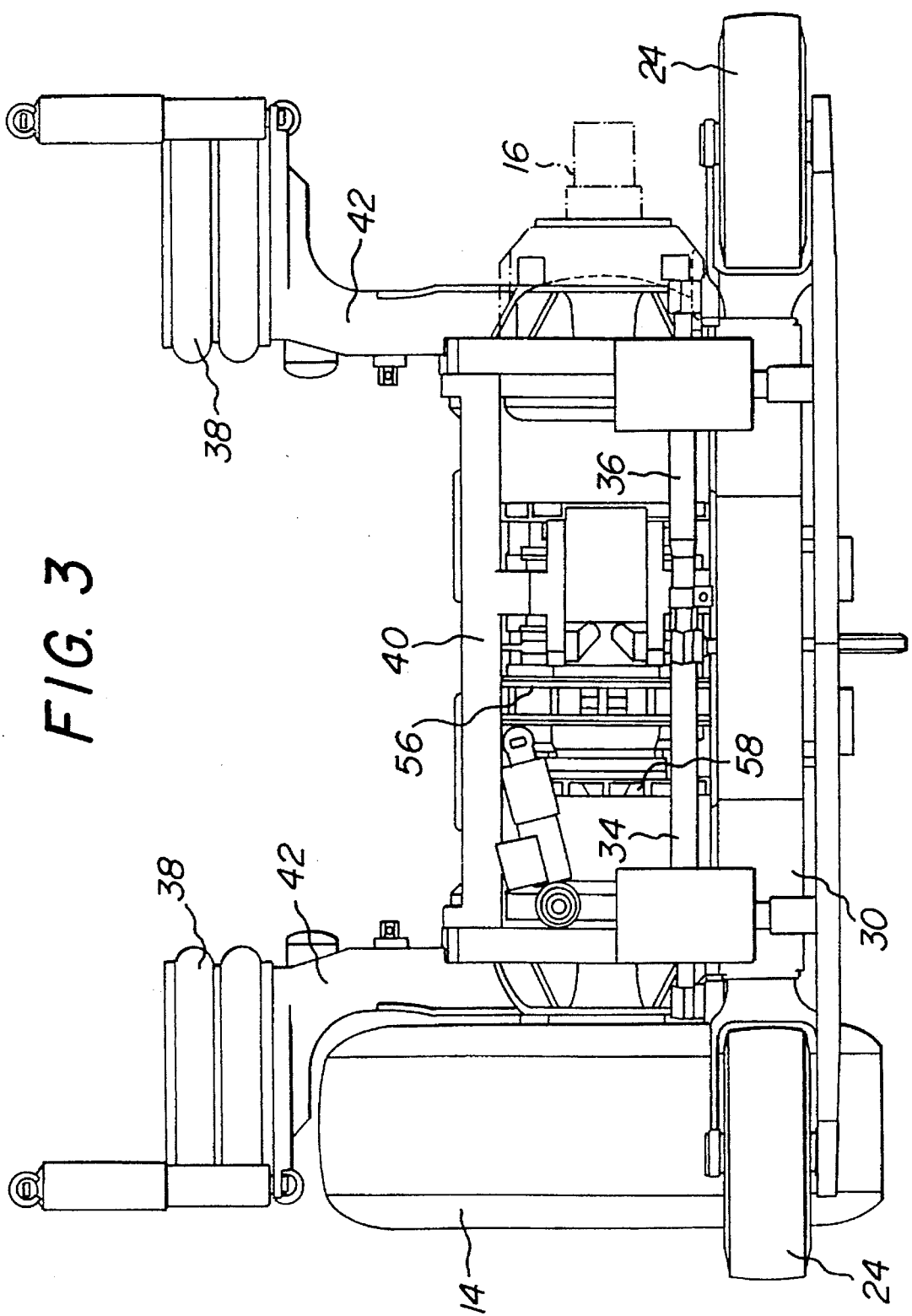
FIG. 3 is an end view of the FIG. 1 wheel set seen looking in for direction of arrow $f_0$ shown in FIG. 1.

The wheel set shown in FIGS. 1 to 3 is particularly suitable for use on a vehicle that is provided with two wheel sets and of the kind described in document FR-A-2,639,596 or FR-A-2,675,105. The wheel set has two driving and load-carrying wheels 14, only one of which is shown, each being carried by a wheel hub 16 that is steerable about a respective axis 18 on a fixed portion. The wheels are designed to run on a track and in general, they are fitted with pneumatic tires which have considerably greater steering effect than do metal wheels.

The steering of the driving and load-carrying wheels 14 is controlled by four guide wheels 24 bearing against rails (not shown) belonging to the track.

The two pairs of guide wheels 24 are situated on either side of the load-carrying wheels 14 about the direction of displacement $f_0$ along the track. They are carried by a guide frame 30 situated beneath the fixed portion of the wheel set, and capable of rotating relative to the fixed portion about a middle vertical axis 29. This frame is H-shaped with its cross-bar supportedby the fixed portion via means such as a ball-bearing ring 31 defining the axis 29.

The hub 16 of each load-carrying wheel rotates in the outer ring of a bearing which is itself rotatable about the vertical steering axis 18, and to which a steering arm 32 is fixed. A drag link 36 (FIG. 2) has its ends hinged respectively to the cross-bar of the H-shaped frame 30 and to the end of the steering arm 32 of one of the load-carrying wheels. A conjugating link 34 has its ends hinged respectively to the ends of the two steering arms 32. The arms 32 and the links 34 and 36 constitute a linkage which forces the steering of the load-carrying wheels 14 so as to align them with the direction imposed by the guide wheels 24.

The fixed portion of the wheel set carries the weight of the vehicle via suspension cushions 38. It is constituted by a transverse box girder which comprises a central box 40 extending transversaly between the two load-carrying wheels 14, and two lateral flanges 42 fixed to the ends of the box 40. The box 40 is made up of cross-members interconnected at their ends, with ambient air free to flow between them. Each of the flanges 42 is generally in the form of a bracket having a vertical portion occupying a respective end of the box 40 and including, on the its outside face, the steering pivot 44 for the corresponding load-carrying wheel, which pivot 44 defines the steering axis 18 (FIG. 5). The other portion of the bracket-shaped flange extends outward at a higher level than the box 40 and it receives a cushion 38 on its top face. This disposition ensures that the pivots 44 are placed beneath the cushions, such that the weight of the vehicle passes relatively directly from the cushions to the wheels instead of being transmitted mainly via the central region of the girder.

Figure 4:
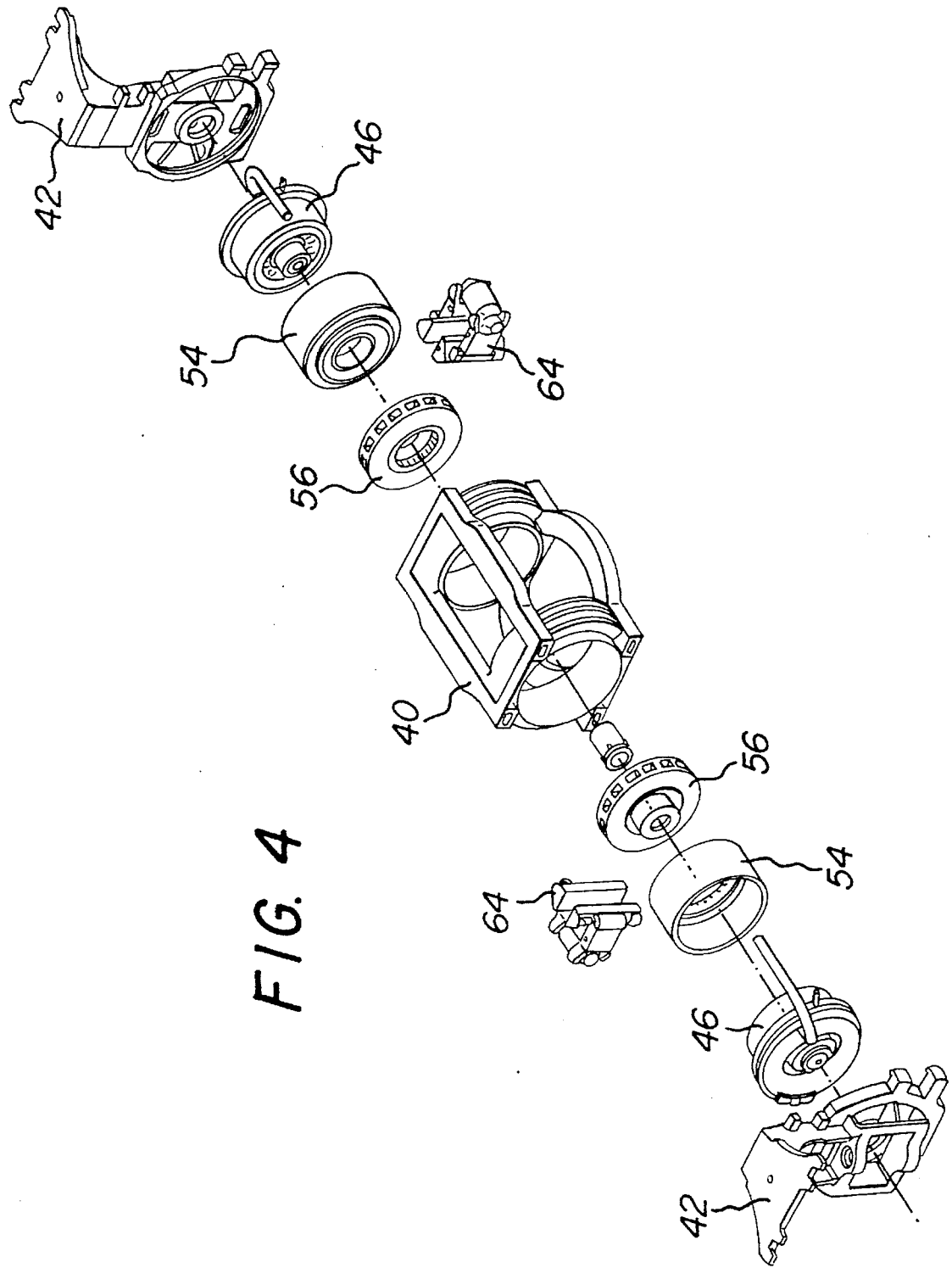
FIG. 4 is an exploded view for showing the components located inside the box girder.

The box girder also serves to receive the drive motors for the wheels. Each load-carrying wheel 14 is driven by a polyphase electric motor belonging thereto and received in the transverse box 40, in a manner shown in FIGS. 4 to 6. To keep FIG. 6 clear, shading is applied only to those elements that belong to the box girder, to the rotor, or to the disk brake.

Each motor comprises a stator 46 carrying inductor windings, and fixed to the flange 42 adjacent to the corresponding load-carrying wheel by screws that are not shown. The stator 46 has a central shaft 48 (not shown in FIG. 4, but visible in FIG. 6) passing therethrough and having one end coupled to the wheel 14 via a constant velocity joint 50 and a stepdown gearbox 52, and both the rotor 54 of the motor and the disk brake 56 are fixed on the opposite end of the central shaft 48. The rotor 54 is generally annular in shape and it carries permanent magnets that co-operate with the stator windings to provide the torque for driving the wheel.

Between the annular portion and the hub for fixing the rotor on the shaft 48, there are openings 58 that pass a flow of air cooling the motor. The cooling air may flow as shown by arrows F in FIG. 6. It penetrates via openings 60 formed in the flange 42 facing the air passages provided through the stator 46, after which it is entrained through the openings 58 of the rotor to escape via openings that are left free between the cross-members forming the box 40 (see also FIGS. 2 and 3). The disk of the brake 56 which also includes cooling fins 62 is situated at the end of the shaft 48 opposite from the wheel 14. It co-operates with brake pads 64 mounted on the box girder.

I claim:

1. A wheel set for a vehicle designed to travel on a guide track, the wheel set having a pair of load-carrying wheels, steerable about parallel axes relative to a fixed portion, and two pairs of guide wheels for bearing laterally against the track, the pairs of guide wheels being situated on either side of the load-carrying wheels, and being carried by a common guide frame that is displaceable relative to the fixed portion, each guide wheel having a respective pivot axis which is fixed relative to the guide frame, the fixed portion being constituted by a transverse box girder placed above the guide frame and provided with steering pivots for the load-carrying wheels, which pivots are placed beneath cushions providing suspension for the vehicle on the wheel set, wherein the guide frame is displaceable relative to the fixed portion only in rotation about a vertical axis, and is connected to the load-carrying wheels by a linkage for forced steering of the load carrying wheels.

2. A wheel set according to claim 1, wherein each of the load-carrying wheels is connected via a stepdown gear box and a constant velocity joint to the annular rotor of an electric traction motor having a stator fixed to a lateral flange supporting one of the lateral pneumatic cushions and receiving the steering pivot of said load-carrying wheel.

3. A wheel set according to claim 2,wherein said annular rotor is connected to the constant velocity joint via a central shaft passing through the stator and carrying a disk brake on its end opposite to the load-caring wheel.

4. A wheel set according to claim 2, wherein the electric motors are polyphase motors having permanent-magnet rotors.

5. A wheel set according to claim 2, wherein the motors are placed inside the girder, which has openings formed therein to allow ventilation air to pass.

6. A wheel set according to claim 2, wherein said flanges belong to the girder.

7. A wheel set according to claim 1, wherein the guide frame is H-shaped with the cross-bar of the H-shape being suspended from the girder by a ball-bearing ring.

8. A wheel set according to claim 7, wherein the cross-bar is connected to a steering arm for a load-carrying wheel via a link which is hinged at both ends.

9. A wheel set according to claim 1, wherein the forced steering linkage includes a link providing a connection between the guide frame and a load-carrying wheel, and also a conjugating link between the two load-carrying wheels.

* * * * *